M. H. McCORMICK.
SAW RELIEVING DEVICE.
APPLICATION FILED NOV. 4, 1920.
1,409,875.
Patented Mar. 14, 1922.
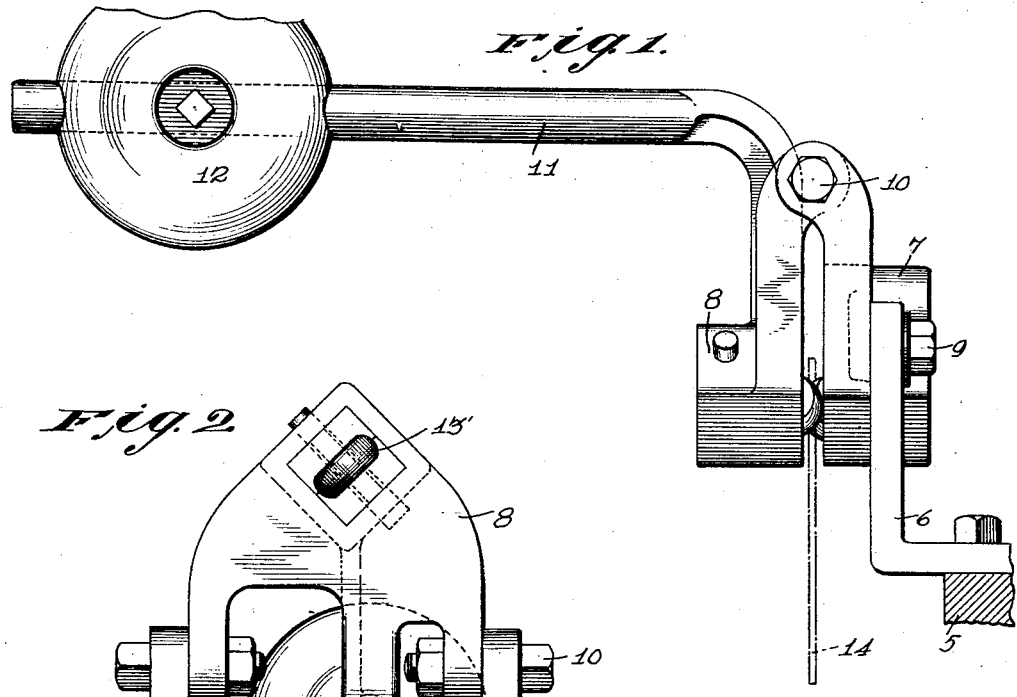
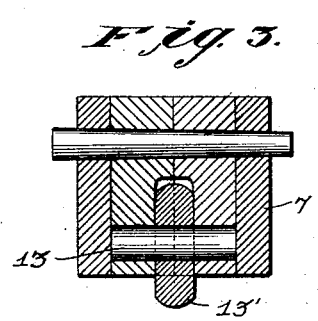
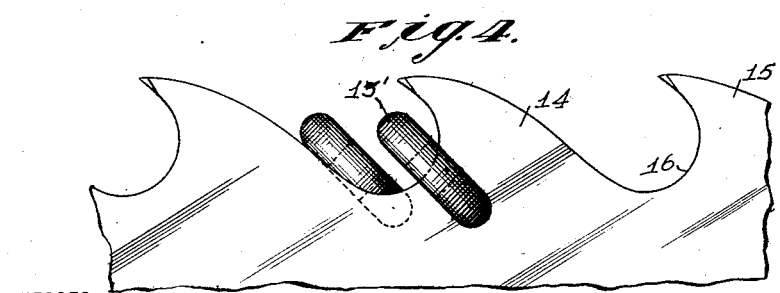
WITNESSES
INVENTOR
M. H. McCORMICK
BY
ATTORNEYS

UNITED STATES PATENT OFFICE.

MERTON H. McCORMICK, OF BENFORD, TEXAS.

SAW-RELIEVING DEVICE.

1,409,875.  Specification of Letters Patent.  Patented Mar. 14, 1922.

Application filed November 4, 1920. Serial No. 421,767.

*To all whom it may concern:*

Be it known that I, MERTON H. McCORMICK, a citizen of the United States, and resident of Benford, in the county of Polk and State of Texas, have invented a new and Improved Saw-Relieving Device, of which the following is a full, clear, and exact description.

My invention relates to a relieving device, and more particularly a device for relieving the gullets of a saw.

I aim to provide a device of this nature by means of which the corners of the gullet between the teeth are operated on, which device may conveniently be associated with a sharpening machine.

A further object of my invention is the construction of a device, and more particularly a relieving device, which shall operate upon each side of the saw upon the corners of the gullets, as the saw is moved through the device.

Further objects of my invention will appear in the annexed specification and drawings, which latter present one practical embodiment of my invention, and in which—

Figure 1 is a side view of a relieving device constructed in accordance with my invention, and showing the parts in operative relationship, with respect to each other.

Figure 2 is a side view of the parts as shown in Figure 1, but illustrating the same in open position.

Figure 3 is an enlarged sectional side view of one of the jaws of the device, and Figure 4 is a somewhat diagrammatic view of the engaging parts of my relieving device, as associated with the gullets of a saw.

In these views the reference numeral 5 indicates the base of a sharpening machine, or other suitable object, to which a bracket 6, of any convenient type, has one of its ends secured, said bracket having my improved relieving device attached to its opposite end.

The relieving device, conveniently includes a pair of jaws 7 and 8 respectively, one of which is conveniently secured as at 9 to the bracket 6, connection between these jaws being afforded by any suitable means, such as pivot pins 10.

To now provide means which will serve to force the jaws to closed position, one with respect to the other, any suitable means such as for instance a lever 11, is utilized, which lever is secured to the jaw 8, and extending beyond the same, a weight 12 being secured to the outer end of the lever 11, which weight will obviously effect an operation of the jaws in the manner desired.

With a view of furnishing an improved gullet relieving means, a pair of rollers 13' are associated one each, with the jaws 7 and 8, and adjacent the outer ends of the same, movement being permitted between the rollers 13' and jaws by any suitable means such as shafts 13, mounting the former and secured to the latter.

It is now to be noted that the rollers 13' are disposed at an angle from the horizontal, such angle being preferably substantially 45°, and it will be obvious that upon the jaws being closed in the manner indicated in Figure 1, that a saw 14, including teeth 15 and gullet 16 may be passed between the jaws 7 and 8 to permit of the rollers 13' cooperating with the gullets 16.

It will thus be appreciated, that I have provided a device of the nature specified, in which rollers preferably arranged at a 45° angle will be provided, which will bear against the corners of the gullets, between the teeth of the saw, such rollers being forced into intimate contact with these portions, by virtue of the weight 12 or other suitable means provided for this purpose.

By virtue of the fact that these rollers present rounded edge portions, and bear against each side of the saw, it will be obvious that as the saw is moved between the jaws 7 and 8, that the corners of the gullets will be operated on, it being noted that one of the rollers is located in advance of the other, whereby to prevent their contacting with each other, at that instant in which the lowest portion of the gullet is passing between them.

Obviously numerous modifications of structure might readily be resorted to without in the least departing from the spirit of my invention, which I claim as—

A saw relieving device including a pair of jaws pivotally secured one to the other, means attached to said jaws adapted to cooperate with the gullets of a saw upon the saw being passed between said jaws, means for fixedly supporting one of said jaws, a lever attached to the second of said jaws, and a weight secured to said lever.

MERTON H. McCORMICK.